June 13, 1950 P. H. THOMAS 2,511,023
AEROGENERATOR TOWER
Filed July 14, 1945 2 Sheets-Sheet 1

INVENTOR
PERCY H. THOMAS
BY
ATTORNEY

June 13, 1950  P. H. THOMAS  2,511,023
AEROGENERATOR TOWER
Filed July 14, 1945  2 Sheets-Sheet 2
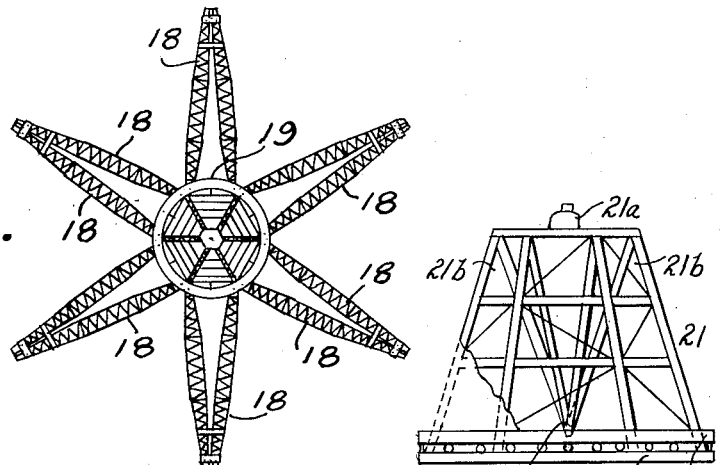
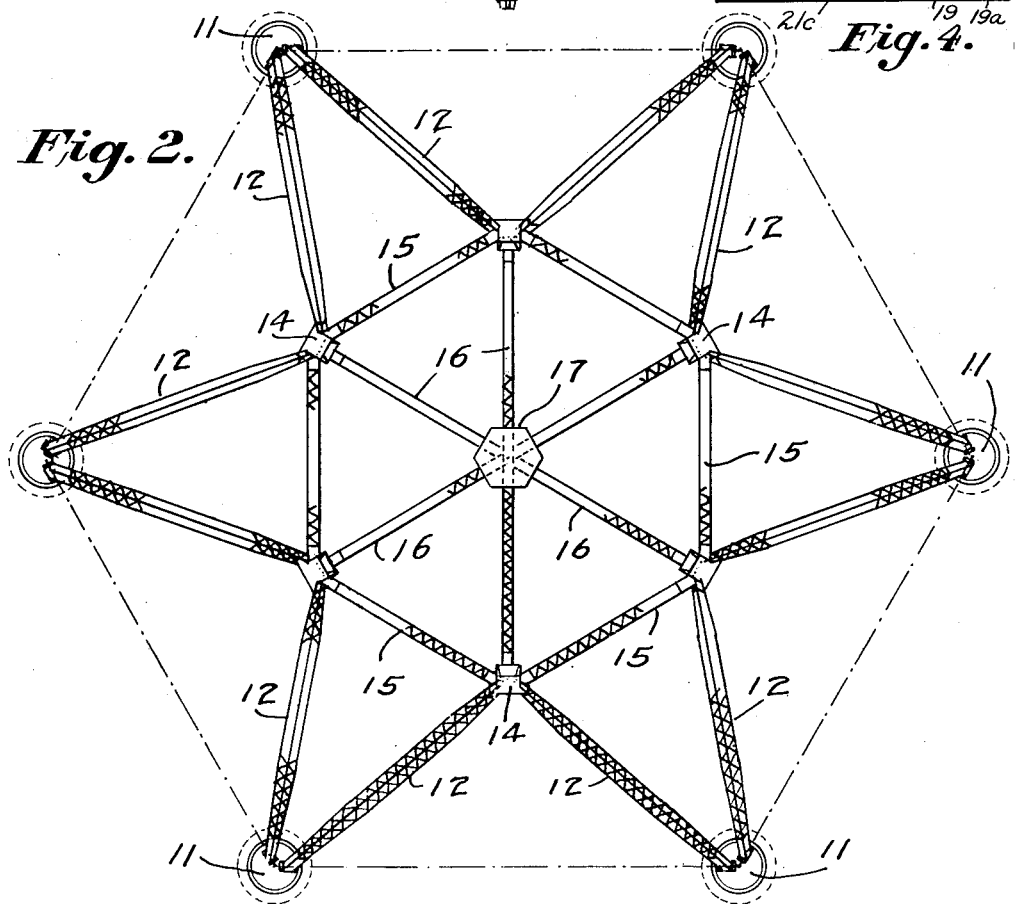
INVENTOR
PERCY H. THOMAS
BY
ATTORNEY Patented June 13, 1950

2,511,023

UNITED STATES PATENT OFFICE 2,511,023

AEROGENERATOR TOWER

Percy H. Thomas, Washington, D. C., assignor to the United States of America as represented by the Chairman of the Federal Power Commission Application July 14, 1945, Serial No. 605,176

3 Claims. (Cl. 189—21)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

My invention relates to towers for supporting wind turbines for developing large volumes of electric power from the wind wherever the average wind velocity is sufficiently strong and constant to make an installation profitable.

The electrical generating plant is mounted upon a tower of novel design and comprises multiple elements, some of which may be hingedly mounted to not only facilitate their erection, but to serve as means to assist in the erection and finally in the support of other portions of the tower and the generating mechanism with its impellers.

In the accompanying drawings:

Figure 2 is a horizontal section of my tower on the plane indicated by the line 2—2 of Figure 1.

Figure 3 is a horizontal section of an upper lift of my tower on the plane indicated by the line 3—3 of Figure 1.

Figure 4 is an enlarged view of the spindle of Figure 1, showing the radial vertical A-frames.

In these drawings:

Figure 1:
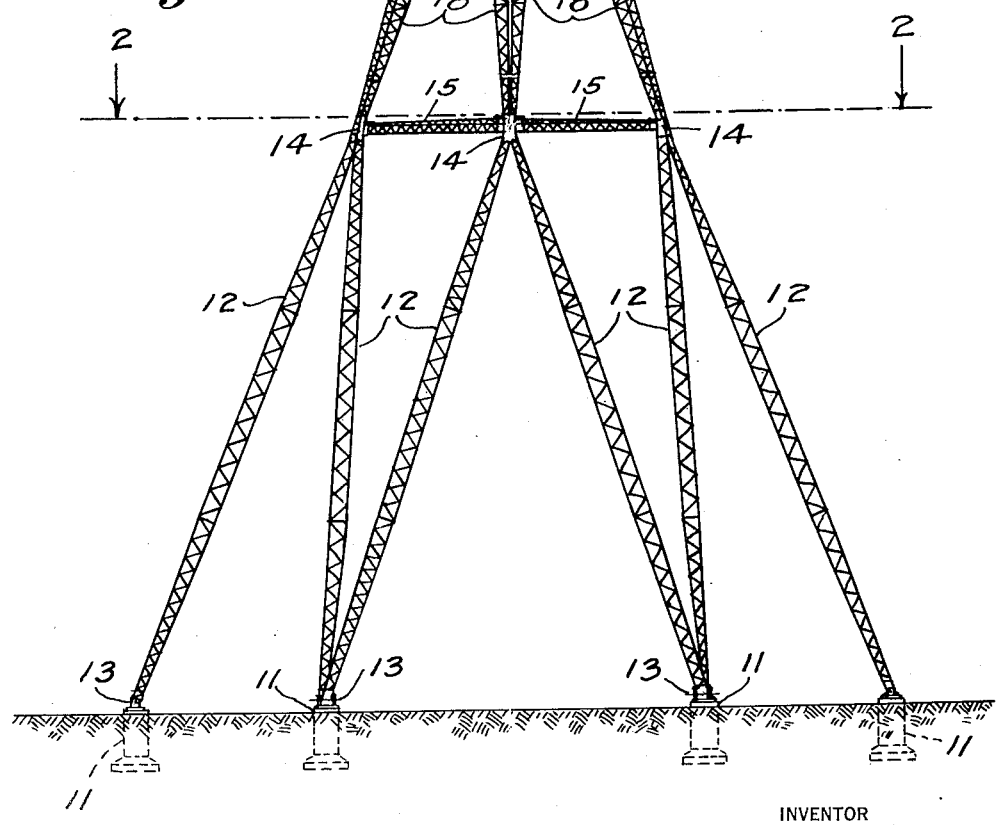
Figure 1 is a front elevation of my tower supporting a revolubly mounted aerogenerator.

A concrete footing 11 is located at each angle of a regular hexagon, and supports two diverging leg members 12, each of which is fastened to the footings by a suitable hinge member 13, a pair of which hinges have their axes in the same line, as indicated by the dot and dash line of Figure 2. The leg members 12 are connected in pairs at 14 to form A-frames which may be swung upwardly about the hinge members 13 and fastened to tie members 15.

These tie members 15 form a hexagon each side of which is shorter than the distance between adjacent footings 11 so that in the completed tower each A-frame is inwardly inclined from the adjacent footings 11. Six radial reinforcing members 16 are fastened to the tie members 15 and also to a central plate 17, thereby forming six triangular stiffening elements.

A second lift is similar to the lower lift and is made of twelve leg members 18 which are connected at 14 to the members 15 and 16 and the leg members 12. The upper ends of each pair of leg members are connected at one of six equally spaced points to a horizontal wheel track ring 19 upon which is mounted my aerogenerator 20 which is free to rotate in the wind inasmuch as the aerogenerator is carried by and secured to the turntable ring 19a, which in turn co-acts with the wheel track 19 to permit such turning. The construction detail of the turntable has been omitted, as such mechanisms are well understood, and the mechanism is not of itself a part of my invention.

The aerogenerator is provided with a spindle 21 and a bridge member 22 which also forms a part of two oppositely extending outriggers 23 having compression members 24 and tension members 25. The spindle 21 serves to take horizontal wind loads and to stabilize the bridge, which action is implemented by a horizontal wheel ring 21a. Structurally, this spindle includes six radial vertical A-frames, arranged on the diameters of a hexagon. The wheel ring 21a is fast at the top of the spindle and within the turntable and the housing. It is located at approximately the level of the resultant aerodynamic thrust of the impellers which is symmetrical about the impeller axis. My outrigger structure as a whole is designed to bring the center of pressure due to the bridge and live loads within the turntable, thereby obviating the need of providing any additional means for resisting overturning.

At the free end of each outrigger 23 there is revolubly mounted an impeller 26 which is connected by suitable shafting and gearing (not shown) to a direct current generator (not shown) within a central housing 27.

A rod-type of radio antennae 28 may be mounted on the housing 27, serving also as a support for a beacon.

By studying the characteristics of wind turbine driven generators, I have found that high average wind velocities are very desirable to secure low cost power, and that the wind velocities increase at greater elevations above the earth's surface, a condition which extends for several hundred meters.

My studies of wind velocity records also show that the average velocities of the winds are very stable and reliable from month to month and year to year. For these reasons I have developed a high tower to take advantage of the greater velocity of the winds for the generation of electric power to supplement the power generated from other sources for electric distribution systems. This utilization of wind power does not exhaust the natural resources of the country.

A wind turbine was installed on "Grandpa's Knob" in Vermont and the electric power generated there by a 1,000 kilowatt wind turbine on a steel tower 110 feet high has been commercially utilized by the Central Vermont Public Service Corporation.

The embodiment of my invention described herein is based on my design of a 475-foot tower for supporting a wind turbine of 7,500 kilowatts output.

My tower has a relatively wide base and uses tapered latticed columns, of a type illustrated in several patents granted to me for transmission line towers, for example Patent Number 1,616,932. It requires no diagonal tension members between legs such as is common in wind mills and towers of the like type. Twelve legs per lift are used and are so inclined as to resist wind pressures regardless of the direction of the wind as well as for resisting torque, since each main leg is normally inclined to the horizontal radius. The use of a greater number of leg members would lead to an uneconomical design, due to greater exposure to wind pressure, which is a serious disadvantage.

While I have described and shown certain embodiments of my invention, it is to be understood that it is capable of many modifications; changes, therefore, in the construction and arrangement may be made without departing from the spirit and scope of the invention as disclosed in the appended claims, in which it is my intention to claim all novelty inherent in my invention as broadly as possible in view of the prior art.

What I claim is:

1. A revolving bridge, a fixed tower, means transmitting vertical stresses from said bridge to said tower, said means including a turntable ring fast to said bridge, centrally located, the center of gravity of the bridge lying within said turntable ring, in combination with a wheel track ring fast in said tower and coacting with and supporting said turntable ring; a rigid spindle secured to said tower, framed with six vertical A-frames and suitable bracing, the ring of the A-frame tops leaving a free space within; a horizontal wheel ring centrally located at the level of the spindle top and secured between said spindle and said bridge, whereby horizontal stresses are transferred to said tower from said bridge.

2. A revolving bridge subjected to heavy horizontal stress, a turntable ring supporting and forming an integral part of said bridge, the center of gravity of said bridge when loaded falling within said turntable ring; in combination with a high-level, heavy-duty supporting tower, provided at the top with a wheel track fast in said tower, and coacting with and supporting said turntable ring; a spindle located on top of and fast in said tower and extending to the level of the said horizontal stress force on the bridge, and a horizontal wheel ring fast between said spindle and said bridge at said level, whereby said horizontal force is transferred from said bridge to said supporting tower.

3. In combination, the following elements, a revolving bridge, a supporting tower, a rigid spindle as a part of and extending above said tower, said spindle being framed with six vertical radial A-frames, interconnected at the center and leaving a free space within at the level of their tops, a turntable, including a turntable ring and a wheel track, supporting said bridge, and a horizontal wheel ring adapted to transfer horizontal stress to said spindle without material overturning moment, these parts being so combined that the wheel track serving as a part of the turntable is fast on the tower and surrounds the spindle; the turntable track being a part of the turntable is fast in the bridge; said wheel ring being centrally located at the circle of the tops of the vertical A-frames is connected between said spindle and said bridge, leaving the bridge free to rotate and stable against displacement and overturning.

PERCY H. THOMAS.

REFERENCES CITED

The following references are of record in the file of this patent:

UNITED STATES PATENTS

| Number | Name | Date |
| --- | --- | --- |
| D. 111,256 | Horton | Sept. 13, 1938 |
| 510,479 | Jones | Dec. 12, 1893 |
| 493,060 | Bowman | Mar. 7, 1893 |
| 538,742 | Perry | May 7, 1895 |
| 665,810 | Stretch | Jan. 8, 1901 |
| 879,162 | George | Feb. 18, 1908 |
| 1,231,242 | Doak | June 26, 1917 |
| 1,364,982 | Calkins | Jan. 11, 1921 |
| 1,633,460 | Silvestrin | June 21, 1927 |
| 1,676,538 | Foster | July 10, 1928 |
| 1,699,949 | Bucklen | Jan. 22, 1929 |
| 1,963,912 | Honnef | June 19, 1934 |
| 2,058,500 | Plucker | Oct. 27, 1936 |
| 2,181,658 | Irwin | Nov. 28, 1939 |
| 2,360,791 | Putnam | Oct. 17, 1944 |
| 2,374,889 | Ording et al. | May 1, 1945 |
| 2,388,377 | Albers | Nov. 6, 1945 |

FOREIGN PATENTS

| Number | Country | Date |
| --- | --- | --- |
| 263,869 | Germany | Sept. 11, 1913 |
| 535,625 | Germany | Jan. 28, 1932 |
| 672,606 | Germany | Mar. 6, 1939 |

OTHER REFERENCES

"Electrical World," April 14, 1934, pages 540 and 541.

"Electrical World," April 28, 1945, pages 73, 74, and 75.

"Power," June 1945, pages 64, 65, 66, 67, and 68.